US012738279B2

(12) United States Patent
Holmberg et al.

(10) Patent No.: US 12,738,279 B2
(45) Date of Patent: Sep. 15, 2026

(54) SPATIAL REPRESENTATION LEARNING

(71) Applicant: Dolby Laboratories Licensing Corporation, San Francisco, CA (US)

(72) Inventors: Paul Holmberg, North Ryde (AU); Hadis Nosrati, Queens Park (AU); Richard J. Cartwright, Killara (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 79 days.

(21) Appl. No.: 18/840,744

(22) PCT Filed: Feb. 28, 2023

(86) PCT No.: PCT/US2023/014003
§ 371 (c)(1),
(2) Date: Aug. 22, 2024

(87) PCT Pub. No.: WO2023/167828
PCT Pub. Date: Sep. 7, 2023

(65) Prior Publication Data

US 2025/0174236 A1 May 29, 2025

Related U.S. Application Data

(60) Provisional application No. 63/315,344, filed on Mar. 1, 2022.

(51) Int. Cl.
*G10L 19/008* (2013.01)
*G10L 25/30* (2013.01)

(52) U.S. Cl.
CPC ............ *G10L 19/008* (2013.01); *G10L 25/30* (2013.01)

(58) Field of Classification Search
CPC ........ G10L 19/008; G10L 25/30; G10L 15/20
See application file for complete search history.

(56) References Cited

U.S. PATENT DOCUMENTS 10,361,673 B1 * 7/2019 Matsukawa .............. H03G 3/02
10,812,424 B1 * 10/2020 Bommaraju ........... G06N 20/00
(Continued)

FOREIGN PATENT DOCUMENTS

CN 113870860 A 12/2021
EP 3955245 A1 2/2022
(Continued)

OTHER PUBLICATIONS

Baevski et al., "1-data2vec: A General Framework for Self-supervised Learning in Speech, Vision and Language," arxiv.org, Cornell University Library, 201 Olin Library Cornell University Ithaca, NY 14853, Oct. 25, 2022, pp. 1-15.
(Continued)

*Primary Examiner* — Michael Colucci

(57) ABSTRACT

Some disclosed methods involve: receiving multi-channel audio data including unlabeled multi-channel audio data; extracting audio feature data from the unlabeled multi-channel audio data; applying a spatial masking process to a portion of the audio feature data; applying a contextual encoding process to the masked audio feature data, to produce predicted spatial embeddings in a latent space; obtaining reference spatial embeddings in the latent space; determining a loss function gradient based, at least in part, on a variance between the predicted spatial embeddings and the reference spatial embeddings; and updating the contextual encoding process according to the loss function gradient until one or more convergence metrics are attained.

29 Claims, 7 Drawing Sheets

(56) References Cited

U.S. PATENT DOCUMENTS

| | | | | |
|---|---|---|---|---|
| 11,521,751 | B2 * | 12/2022 | Li | G16H 50/30 |
| 12,548,310 | B1 * | 2/2026 | Wang | G06V 10/255 |
| 2009/0018828 | A1 | 1/2009 | Nakadai | |
| 2012/0123773 | A1 | 5/2012 | Zeng | |
| 2012/0183110 | A1 * | 7/2012 | Kolze | H04B 1/10 375/350 |
| 2014/0355768 | A1 * | 12/2014 | Sen | G10L 19/008 381/23 |
| 2017/0278513 | A1 | 9/2017 | Li | |
| 2018/0268808 | A1 | 9/2018 | Song | |
| 2019/0259396 | A1 * | 8/2019 | Wuebbolt | G10L 19/008 |
| 2020/0051580 | A1 | 2/2020 | Seo | |
| 2020/0349928 | A1 | 11/2020 | Mandal | |
| 2020/0365152 | A1 | 11/2020 | Han | |
| 2020/0395006 | A1 | 12/2020 | Smith | |
| 2020/0402497 | A1 * | 12/2020 | Semenov | G06N 3/094 |
| 2021/0158799 | A1 | 5/2021 | Zhang | |
| 2021/0232915 | A1 * | 7/2021 | Dalli | G06N 3/045 |
| 2021/0312674 | A1 * | 10/2021 | Abrol | G06T 7/11 |
| 2021/0350786 | A1 * | 11/2021 | Chen | G10L 15/063 |
| 2021/0375294 | A1 | 12/2021 | Gu | |
| 2021/0383796 | A1 | 12/2021 | Coucke | |
| 2022/0083807 | A1 * | 3/2022 | Zhang | G06F 18/214 |
| 2022/0093106 | A1 * | 3/2022 | Mosayyebpour Kaskari | G06N 3/044 |
| 2022/0221374 | A1 * | 7/2022 | Gan | G06N 3/04 |
| 2022/0284634 | A1 * | 9/2022 | Griffin | G06T 11/00 |
| 2022/0329953 | A1 * | 10/2022 | Chen | H04R 25/353 |
| 2022/0366898 | A1 * | 11/2022 | Qian | G10L 15/22 |
| 2022/0415146 | A1 * | 12/2022 | Albero | G08B 13/1609 |
| 2023/0096805 | A1 * | 3/2023 | Kim | G06N 3/088 704/232 |
| 2023/0153533 | A1 * | 5/2023 | Mahapatra | G06F 18/214 704/9 |

FOREIGN PATENT DOCUMENTS

| | | | |
|---|---|---|---|
| WO | 2021154211 | A1 | 8/2021 |
| WO | 2023086253 | A1 | 5/2023 |
| WO | 2024044586 | A1 | 2/2024 |

OTHER PUBLICATIONS

Efthymios et al., "Two-Step Sound Source Separation: Training on Learned Latent Targets" arxiv.org, Cornell University Library, 201 Olin Library Cornell University Ithaca, NY 14853; Oct. 23, 2019, pp. 1-5.

Hsu et al., "HUBERT: Self-Supervised Speech Representation Learning by Masked Prediction of Hidden Units," arxiv.org, Cornell University Library, 201 Olin Library Cornell University Ithaca, NY 14853; Jun. 14, 2021, pp. 1-10.

Liu et al., "TERA: Self-Supervised Learning of Transformer Encoder Representation for Speech" IEEE/ACM Transactions on Audio, Speech, and Language Processing, IEEE, USA, vol. 29, Jul. 8, 2021 (Jul. 8, 2021), pp. 2351-2366, 16 pages.

Schimmel et al., "A Fast and Accurate "Shoebox" Room Acoustics Simulator," ICASSP-88., 1988 International Conference on May 2009, pp. 241-244 5 pages.

Seki et al., "Generalized Multichannel Variational Autoencoder for Underdetermined Source Separation", 2019 27th European Signal Processing Conference (EUSIPCO), EURASIP, Sep. 2, 2019 (Sep. 2, 2019), pp. 1-5.

Y. Koyama et al., "Spatial Data Augmentation with Simulated Room Impulse Responses for Sound Event Localization and Detection", arXiv.org, XP093393852, pp. 1-5, 5 pages.

L. Mazzon et al., "First Order Ambisonics Domain Spatial Augmentation for DNN-Based Direction of Arrival Estimation", arXiv.org, Oct. 10, 2019 (Oct. 10, 2019), XP093393874, pp. 1-5, 5 pages.

Q. Wang et al., "A Four-Stage Data Augmentation Approach to ResNet-Conformer Based Acoustic Modeling for Sound Event Localization and Detection", Arxiv.Org Cornell University Library, 201 Olin Library Cornell University Ithaca, NY 14853, Jan. 8, 2021, XP081855076, pp. 1-12, 12 pages.

* cited by examiner

SPATIAL REPRESENTATION LEARNING

CROSS-REFERENCE TO RELATED APPLICATIONS

This application is a U.S. National Stage application under U.S.C. 371 of International Application No. PCT/US2023/014003, filed on Feb. 28, 2023, which claims priority of the U.S. Provisional Application No. 63/315,344, filed Mar. 1, 2022, which is incorporated herein by reference in its entirety.

TECHNICAL FIELD

This disclosure pertains to devices, systems and methods for determining spatial attributes of sound sources in multi-channel audio signals.

BACKGROUND

Some methods, devices and systems for estimating sound source locations signal in multi-channel audio signals, such as methods that involve the use of pre-labeled training data, are known. Although existing devices, systems and methods can provide benefits in some contexts, improved devices, systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers) driven by a single speaker feed. A typical set of headphones includes two speakers. A speaker may be implemented to include multiple transducers (e.g., a woofer and a tweeter), which may be driven by a single, common speaker feed or multiple speaker feeds. In some examples, the speaker signal(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is a smart audio device, such as a "smart speaker," which may be configured to implement at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via one or more methods. In some instances, the method(s) may be implemented, at least in part, by a control system and/or via instructions (e.g., software) stored on one or more non-transitory media. Some methods may involve receiving, by a control system, multi-channel audio data. The multi-channel audio data may be, or may include, unlabeled multi-channel audio data. Some such methods may involve extracting, by the control system, audio feature data from the unlabeled multi-channel audio data. Some such methods may involve masking, by the control system, a portion of the audio feature data, to produce masked audio feature data. The masking may be, or may involve, spatial masking.

Some such methods may involve applying, by the control system, a contextual encoding process to the masked audio feature data, to produce predicted spatial embeddings in a latent space. Some such methods may involve obtaining, by the control system, reference spatial embeddings in the latent space. Some such methods may involve determining, by the control system, a loss function gradient based, at least in part, on a variance between the predicted spatial embeddings and the reference spatial embeddings. Some such methods may involve updating, by the control system, the contextual encoding process according to the loss function gradient until one or more convergence metrics are attained.

In some examples, obtaining reference spatial embeddings in the latent space may involve applying, by the control system, a contextual encoding process to unmasked audio feature data corresponding to the masked audio feature data, to produce the reference spatial embeddings. According to some examples, obtaining reference spatial embeddings in the latent space may involve a spatial unit discovery process. In some examples, the spatial unit discovery process may involve clustering spatial features into a plurality of granularities. According to some examples, the clustering may involve applying an ensemble of k-means models with different codebook sizes.

In some examples, the spatial unit discovery process may involve generating a library of code words. In some such examples, each code word may correspond to an acoustic zone of an audio environment. According to some examples, each code word may correspond to a spatial position of a sound source relative to microphones used to capture at least some of the multi-channel audio data. In some examples, each code word may correspond to covariance of signals corresponding to sound captured by each microphone of a plurality of microphones used to capture the multi-channel audio data. According to some examples, the covariance of signals may be represented by a microphone covariance matrix. Some disclosed methods may involve updating the library of code words according to output of the contextual encoding process.

In some examples, the predicted spatial embeddings may correspond to estimated cluster centroids in the latent space. According to some examples, the predicted spatial embeddings may correspond to representations of acoustic zones in the latent space.

According to some examples, the multi-channel audio data may include at least N-channel audio data and M-channel audio data. N and M may be greater than or equal to 2 and may represent integers of different values. In some examples, the multi-channel audio data may include audio data captured by two or more different types of microphone arrays.

In some examples, the control system may be configured to implement a neural network. According to some examples, the neural network may be trained according to a self-supervised learning process.

Some disclosed methods may involve training a neural network implemented by the control system, after the control system has been trained according to one of the disclosed methods, to implement noise suppression functionality, speech recognition functionality, talker identification functionality, source separation functionality, voice activity detection functionality, audio scene classification functionality, source localization functionality, noise source recognition functionality or combinations thereof. Some such disclosed methods may involve implementing, by the control system, the noise suppression functionality, the speech recognition functionality or the talker identification functionality.

According to some examples, the spatial masking may involve concealing, corrupting or eliminating at least a portion of spatial information of the multi-channel audio data. In some examples, the spatial masking may involve presenting audio data from channel A as being audio data from channel B and presenting audio data from channel B as being audio data from channel A during a masking time interval. According to some examples, the spatial masking may involve adding, during the masking time interval, audio data corresponding to an artificial sound source in an artificial sound source acoustic zone. the spatial masking may involve reducing, during the masking time interval, a number of uncorrelated channels of the multi-channel audio data. According to some examples, the spatial masking may involve altering, during the masking time interval, an apparent acoustic zone of a sound source.

In some examples, the spatial masking may involve increasing, during the masking time interval, a number of correlated channels of the multi-channel audio data. According to some examples, the spatial masking may involve combining, during the masking time interval, 2 or more audio signals corresponding to 2 or more independent sound sources in a single channel. In some examples, the spatial masking may involve altering, during the masking time interval, microphone signal covariance information of the multi-channel audio data.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via apparatus. For example, one or more devices (e.g., a system that includes one or more devices) may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system may be configured for implementing some or all of the methods disclosed herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Previous approaches to audio processing, particularly in the context of speech processing, relied on extracting engineered sets of features for a particular task and using those features to conduct the task under supervision. This type of approach needed expert-domain knowledge, a massive amount of labelled data and changing the features from one task to another.

The advent of machine learning (ML) and its advancement in areas such as speech processing provided the opportunity to represent speech in what is called a "latent space" in which the high-level attributes or distinct characteristics of audio signals can be derived automatically from the data. Representations in a latent space be used to enable or improve a variety of use case applications, including but not limited to sound event classification, talker identification and automatic speech recognition.

In recent years, self-supervised learning techniques have begun to be applied to various tasks, such as image data learning tasks. According to self-supervised learning techniques, the latent space and feature representations are learned without prior knowledge about the task and without labelled training data. Self-supervised learning has recently been adopted in speech analytics applications using single-channel speech data, in other words using audio data corresponding to speech that has been captured using a single microphone. However, there is little known about high-level representations of multi-channel audio data—for example, audio data corresponding to multiple sound sources, potentially including speech, that has been captured using multiple microphones—in a latent space. Many related questions—such as how the location of the talkers, interfering speech or other interfering sound sources may affect the speech representation—have not previously been answered.

This disclosure provides examples of spatial representation learning (SPRL), which involves modelling high-level spatial attributes of one or more sound sources (such as voices) captured on a device that includes an array of microphones. In some examples of spatial representation learning, spatial dimensions are added to embedding representations by learning spatial information corresponding to multi-channel audio data corresponding to speech. Localizing the sound sources represented by multichannel audio data and learning the spatial attributes of these sound sources in a latent space can improve various learning tasks and downstream audio processing tasks, including but not limited to noise suppression, speech recognition and talker identification.

Figure 1A:
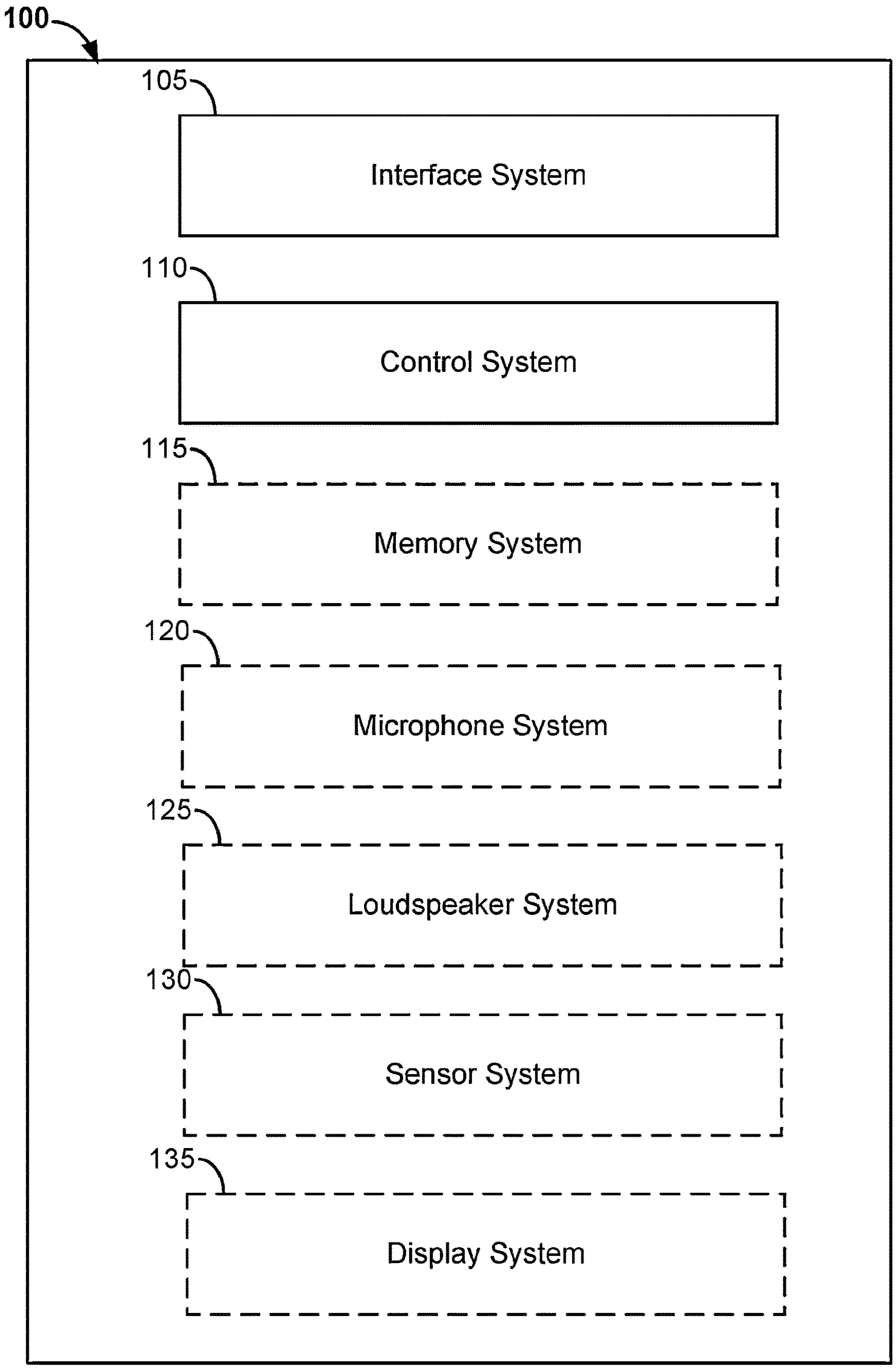
FIG. 1A is a block diagram that shows examples of components of an apparatus capable of implementing various aspects of this disclosure.

FIG. 1A is a block diagram that shows examples of components of an apparatus capable of implementing various aspects of this disclosure. As with other figures provided herein, the types, numbers and arrangements of elements shown in FIG. 1A are merely provided by way of example. Other implementations may include more, fewer and/or different types, numbers and arrangements of elements. According to some examples, the apparatus 100 may be configured for performing at least some of the methods disclosed herein. In some implementations, the apparatus 100 may be, or may include, one or more components of an office workstation, one or more components of a home entertainment system, etc. For example, the apparatus 100 may be a laptop computer, a tablet device, a mobile device (such as a cellular telephone), a smart home hub, a television or another type of device.

According to some alternative implementations the apparatus 100 may be, or may include, a server. In some such examples, the apparatus 100 may be, or may include, an encoder. In some examples, the apparatus 100 may be, or may include, a decoder. Accordingly, in some instances the apparatus 100 may be a device that is configured for use within an environment, such as a home environment, whereas in other instances the apparatus 100 may be a device that is configured for use in "the cloud," e.g., a server.

In this example, the apparatus 100 includes an interface system 105 and a control system 110. The interface system 105 may, in some implementations, be configured for communication with one or more other devices of an environment. The environment may, in some examples, be a home environment. In other examples, the environment may be another type of environment, such as an office environment, an automobile environment, a train environment, a street or sidewalk environment, a park environment, etc. The interface system 105 may, in some implementations, be configured for exchanging control information and associated data with other devices of the environment. The control information and associated data may, in some examples, pertain to one or more software applications that the apparatus 100 is executing.

The interface system 105 may, in some implementations, be configured for receiving, or for providing, a content stream. In some examples, the content stream may include video data and audio data corresponding to the video data. The audio data may include, but may not be limited to, audio signals. In some instances, the audio data may include spatial data, such as channel data and/or spatial metadata. Metadata may, for example, have been provided by what may be referred to herein as an "encoder."

The interface system 105 may include one or more network interfaces and/or one or more external device interfaces (such as one or more universal serial bus (USB) interfaces). According to some implementations, the interface system 105 may include one or more wireless interfaces. The interface system 105 may include one or more devices for implementing a user interface, such as one or more microphones, one or more speakers, a display system, a touch sensor system, a gesture sensor system, or combinations thereof. Accordingly, while some such devices are represented separately in FIG. 1A, such devices may, in some examples, correspond with aspects of the interface system 105.

In some examples, the interface system 105 may include one or more interfaces between the control system 110 and a memory system, such as the optional memory system 115 shown in FIG. 1A. Alternatively, or additionally, the control system 110 may include a memory system in some instances. The interface system 105 may, in some implementations, be configured for receiving input from one or more microphones in an environment.

The control system 110 may, for example, include a general purpose single- or multi-chip processor, a digital signal processor (DSP), an application specific integrated circuit (ASIC), a field programmable gate array (FPGA) or other programmable logic device, discrete gate or transistor logic, discrete hardware components, or combinations thereof.

In some implementations, the control system 110 may reside in more than one device. For example, in some implementations a portion of the control system 110 may reside in a device within one of the environments referred to herein and another portion of the control system 110 may reside in a device that is outside the environment, such as a server, a mobile device (such as a smartphone or a tablet computer), etc. In other examples, a portion of the control system 110 may reside in a device within one of the environments depicted herein and another portion of the control system 110 may reside in one or more other devices of the environment. For example, control system functionality may be shared by an orchestrating device (such as what may be referred to herein as a smart home hub) and one or more other devices of the environment. In other examples, a portion of the control system 110 may reside in a device that is implementing a cloud-based service, such as a server, and another portion of the control system 110 may reside in another device that is implementing the cloud-based service, such as another server, a memory device, etc. The interface system 105 also may, in some examples, reside in more than one device.

In some implementations, the control system 110 may be configured to perform, at least in part, the methods disclosed herein. According to some examples, the control system 110 may be configured to receive multi-channel audio data. The multi-channel audio data may be, or may at least include, unlabeled multi-channel audio data. In some instances, all of the multi-channel audio data may be unlabeled. According to some examples, the multi-channel audio data may include audio data corresponding to speech captured by microphone arrays of various types, audio data having varying numbers of channels, or combinations thereof. In some examples, the control system 110 may be configured to extract audio feature data from the unlabeled multi-channel audio data. According to some examples, the control system 110 may be configured to mask a portion of the audio feature data, to produce masked audio feature data. In some examples, the masking process may involve spatial masking. Various examples of spatial masking are provided in this disclosure.

In some examples, the control system 110 may be configured to apply a contextual encoding process to the masked audio feature data, to produce predicted spatial embeddings in a latent space. According to some such examples, the control system 110 may be configured to implement a neural network that is configured to apply the contextual encoding process.

According to some examples, the control system 110 may be configured to obtain reference spatial embeddings in the latent space and to determine a loss function gradient based, at least in part, on a variance between the predicted spatial embeddings and the reference spatial embeddings. In some examples, the control system 110 may be configured to update the contextual encoding process according to the loss function gradient until one or more convergence metrics are attained. Some examples of these processes are described below.

As noted elsewhere herein, the control system 110 may reside in a single device or in multiple devices, depending on the particular implementation. In some examples, all of the foregoing processes may be performed by the same device. In some alternative examples, the foregoing processes may be performed by two or more devices. For example, the extraction of feature data and the masking process may be performed by one device and the remaining processes may be performed by one or more other devices, such as one or more devices (for example, one or more servers) that are configured to implement a cloud-based service. In some alternative examples, the extraction of feature data may be performed by one device and the masking process may be performed by another device.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 115 shown in FIG. 1A and/or in the control system 110. Accordingly, various innovative aspects of the subject matter described in this disclosure can be implemented in one or more non-transitory media having software stored thereon. The software may, for example, include instructions for controlling at least one device to perform some or all of the methods disclosed herein. The software may, for example, be executable by one or more components of a control system such as the control system 110 of FIG. 1A.

In some examples, the apparatus 100 may include the optional microphone system 120 shown in FIG. 1A. The optional microphone system 120 may include one or more microphones. According to some examples, the optional microphone system 120 may include an array of microphones. In some examples, the array of microphones may be configured to determine direction of arrival (DOA) and/or time of arrival (TOA) information, e.g., according to instructions from the control system 110. The array of microphones may, in some instances, be configured for receive-side beamforming, e.g., according to instructions from the control system 110. In some implementations, one or more of the microphones may be part of, or associated with, another device, such as a speaker of the speaker system, a smart audio device, etc. In some examples, the apparatus 100 may not include a microphone system 120. However, in some such implementations the apparatus 100 may nonetheless be configured to receive microphone data corresponding to one or more microphones in an environment, or corresponding to one or more microphones in another environment, via the interface system 110. In some such implementations, a cloud-based implementation of the apparatus 100 may be configured to receive microphone data, or data corresponding to the microphone data (such as multichannel audio data that corresponds to speech), obtained in one or more microphones in an environment via the interface system 110.

According to some implementations, the apparatus 100 may include the optional loudspeaker system 125 shown in FIG. 1A. The optional loudspeaker system 125 may include one or more loudspeakers, which also may be referred to herein as "speakers" or, more generally, as "audio reproduction transducers." In some examples (e.g., cloud-based implementations), the apparatus 100 may not include a loudspeaker system 125.

In some implementations, the apparatus 100 may include the optional sensor system 130 shown in FIG. 1A. The optional sensor system 130 may include one or more touch sensors, gesture sensors, motion detectors, cameras, eye tracking devices, or combinations thereof. In some implementations, the one or more cameras may include one or more free-standing cameras. In some examples, one or more cameras, eye trackers, etc., of the optional sensor system 130 may reside in a television, a mobile phone, a smart speaker, or combinations thereof. In some examples, the apparatus 100 may not include a sensor system 130. However, in some such implementations the apparatus 100 may nonetheless be configured to receive sensor data for one or more sensors (such as cameras, eye trackers, etc.) residing in or on other devices in an environment via the interface system 110.

In some implementations, the apparatus 100 may include the optional display system 135 shown in FIG. 1A. The optional display system 135 may include one or more displays, such as one or more light-emitting diode (LED) displays. In some instances, the optional display system 135 may include one or more organic light-emitting diode (OLED) displays. In some examples, the optional display system 135 may include one or more displays of a television, a laptop, a mobile device, a smart audio device, or another type of device. In some examples wherein the apparatus 100 includes the display system 135, the sensor system 130 may include a touch sensor system and/or a gesture sensor system proximate one or more displays of the display system 135. According to some such implementations, the control system 110 may be configured for controlling the display system 135 to present one or more graphical user interfaces (GUIs).

According to some such examples the apparatus 100 may be, or may include, a smart audio device, such as a smart speaker. In some such implementations the apparatus 100 may be, or may include, a wakeword detector. For example, the apparatus 100 may be configured to implement (at least in part) a virtual assistant.

Figure 1B:
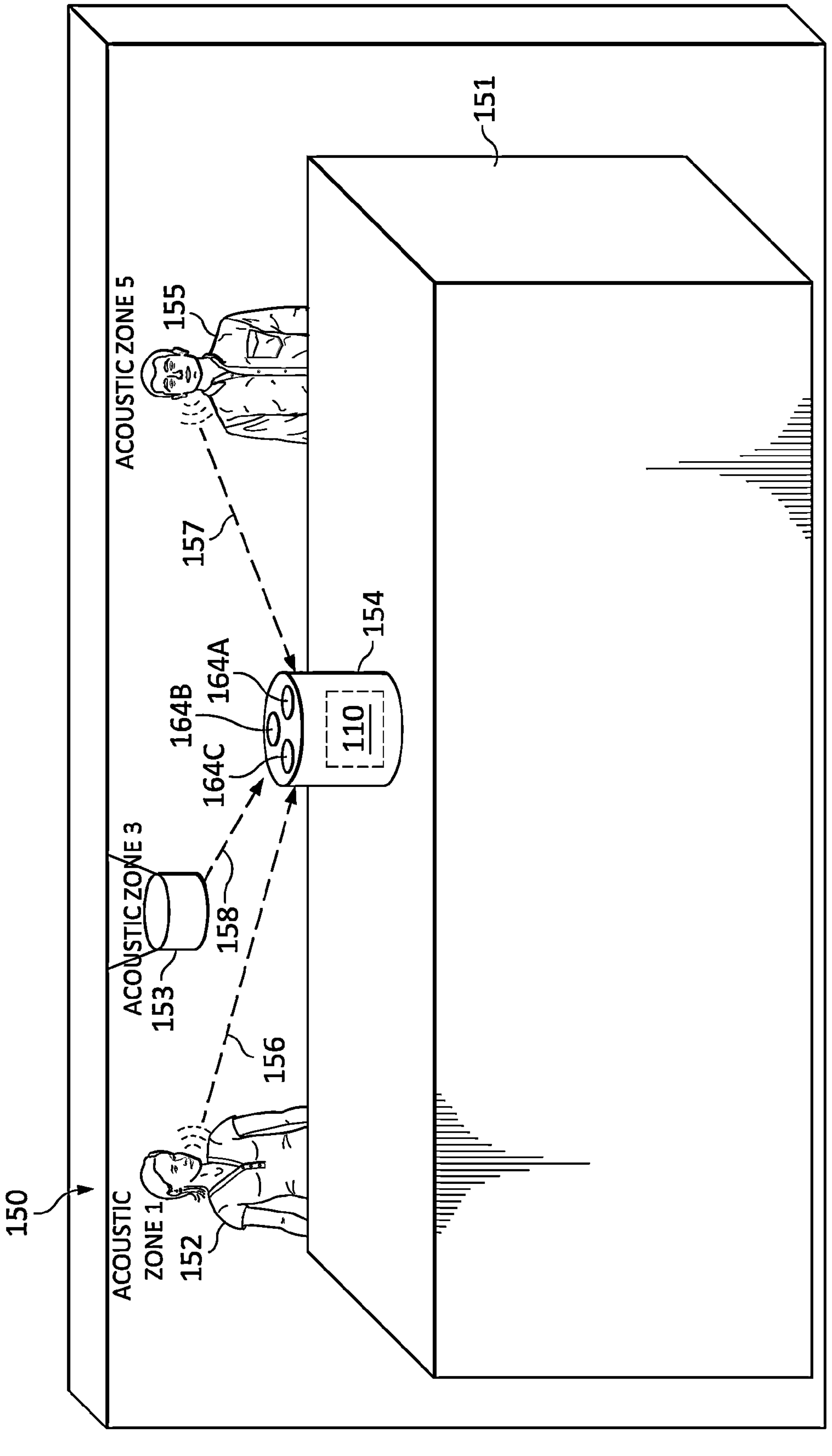
FIG. 1B shows an example of talkers in an audio environment.

FIG. 1B shows an example of talkers in an audio environment. As with other figures provided herein, the types, numbers and arrangements of elements shown in FIG. 1B are merely provided by way of example. Other implementations may include more, fewer and/or different types, numbers and arrangements of elements.

FIG. 1B shows an audio environment 150, wherein audio device 154 is detecting sounds using a microphones 164A, 164B and 164C, thereby capturing multichannel audio. The audio device 154 may, for example, be a smart audio device, such as a smart speaker. According to this example, the audio device 154 is an instance of the apparatus 100 of FIG. 1A. In this example, the talkers 152 and 155 are located in acoustic zones 1 and 5. The talkers 152 and 155 talk to each other and to the audio device 154 while an interfering noise source, which is a rangehood 153 in this example, is running in acoustic zone 3. In this example, the term "acoustic zone" refers to a spatial location within the acoustic environment 150. Acoustic zones may be determined in various ways, depending on the particular implementation. The acoustic zone of the talker 155, for example, may correspond to a volume within which the talker 155 is currently sitting or standing, a volume corresponding to the size of the talker 155's head, a volume within which the talker 155's head moves during a teleconference, etc. In some such examples, an acoustic zone may be defined according to the location of a center, or a centroid, of such a volume. It is advantageous for acoustic zones to be defined such that each defined acoustic zone can be distinguished from every other defined acoustic zone according to sound emitted from the acoustic zones. For example, if acoustic zone A is adjacent to acoustic zone B, it is desirable that a microphone array—such as the microphones 164A, 164B and 164C of FIG. 1B—is able to determine that sounds emitted from acoustic zone A are coming from a different direction than sounds emitted from acoustic zone B, for example according to the directions of arrival of sounds emitted from acoustic zones A and B.

According to this example, a control system 110 uses the multichannel captured audio and a pretrained SPRL model to perform multi-channel downstream tasks such as real-time talker identification, automatic speech recognition, one or more other downstream tasks, or combinations thereof. As noted elsewhere herein, the control system 110 may, in some instances, reside in more than one device. In some examples, the downstream tasks may be performed, at least in part, by another device, such as a server.

The elements of FIG. 1B include the following:

150: An audio environment, which is a room in this example;

151: A table;

152, 155: talkers in spatial locations "acoustic zone 1" and "acoustic zone 5";

153: A rangehood in spatial location "acoustic zone 3";

154: An audio device;

164A 164B and 164C: A plurality of microphones in or on device 154;

164, 157: Direct speech from talkers 152 and 155 to the microphones 164A, 164B, and 164C;

110: A control system residing at least partially in the audio device, part of which may also reside elsewhere (such as one or more servers of a cloud-based service provider), which is configured to analyze the audio captured by the microphones 164A 164B and 164C.

Figure 2:
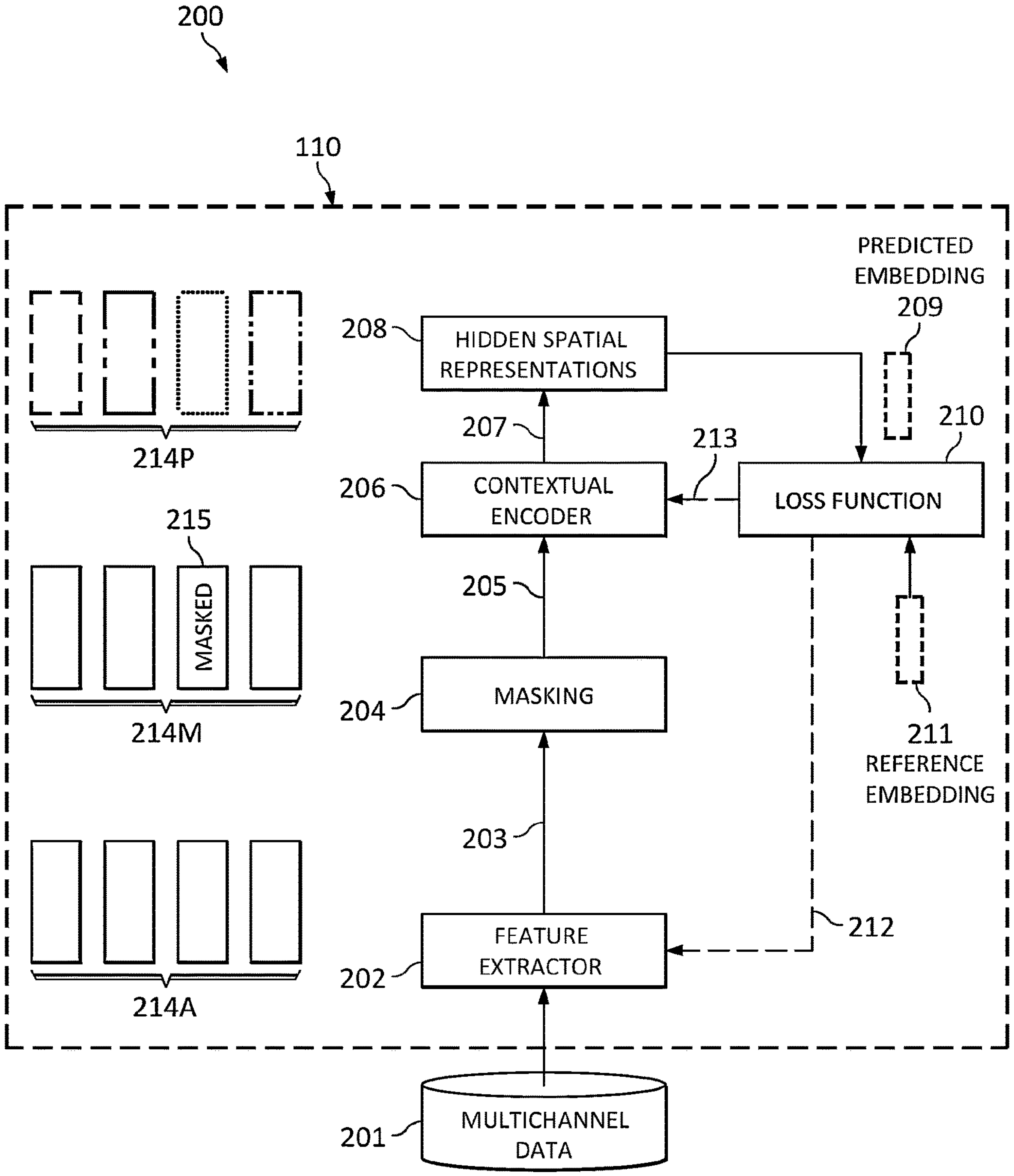
FIG. 2 shows blocks of a spatial representation learning (SPRL) system according to one example.

FIG. 2 shows blocks of a spatial representation learning (SPRL) system according to one example. FIG. 2 shows an example of an SPRL system 200 in which hidden spatial representations are learned using a contextual encoder 206, which also may be referred to herein as a contextual network 206. In some examples, the hidden spatial representations may be learned according to a self-supervised training process. As with other figures provided herein, the types, numbers and arrangements of elements shown in FIG. 2 are merely provided by way of example. Other implementations may include more, fewer and/or different types, numbers and arrangements of elements. In this example, the blocks of the SPRL system 200 are implemented by an instance of the control system 110 of FIG. 1A. As noted elsewhere herein, the control system 110 may, in some implementations, reside in more than one device. For example, the contextual encoder 206 may be implemented by one device and other blocks (such as the audio feature extractor 202, the masking block 204, or both) may be implemented by one or more other devices.

In this example, the audio feature extraction block 202 is configured to extract audio features 203 from multi-channel audio data 201. According to this example, the multi-channel audio data 201 is training data that includes unlabeled multi-channel audio data. In some examples, all of the multi-channel audio data 201 may be unlabeled multi-channel audio data. At least some of the multi-channel audio data 201 includes audio data corresponding to multiple sound sources, potentially including speech, that has been captured using multiple microphones. In some implementations, the multi-channel audio data 201 includes audio data that has been captured by two or more different types of microphone arrays, and in some examples includes audio data that has been captured by many (for example, 5 or more, 10 or more, 15 or more, etc.) different types of microphone arrays. According to some examples, the multi-channel audio data 201 may include at least N-channel audio data and M-channel audio data, wherein N and M are greater than or equal to 2 and represent integers of different values. For example, the multi-channel audio data 201 may include at least two-channel audio data and five-channel audio data.

The audio features 203 extracted by the audio feature extraction block 202 also may be referred to herein as audio feature vectors. The audio features 203 may vary according to the particular implementation. In some examples, the audio features 203 may simply be time samples. In other examples, the audio features 203 may be frequency band or bin energies. According to some examples, the audio features 203 may be transform bins stacked across multiple channels.

In one optional example of the SPRL system 200, the gradient 212 of the loss function 210 with respect to audio feature extraction parameters may be provided to the audio feature extraction block 202. Accordingly, in this example, the SPRL system 200 optionally includes an audio feature extraction block 202 that is configured to learn what audio feature extraction parameters are relatively more or relatively less effective and to modify the audio feature extraction parameters accordingly. In this example, extracted audio feature 214A is an extracted audio feature for a particular time frame.

According to this example, the masking block 204 is configured to mask one or more portions or sections of the audio features 203, to produce the masked audio feature data 205. In this example, the masked audio feature 214M—which is a part of the masked audio feature data 205—is the masked counterpart of the extracted audio feature 214A. However, in some alternative examples, the masking process or processes may occur before the audio feature extraction process. In other words, in some examples, the masking block 204 may be configured to apply one or more types of masking processes to the multi-channel audio data 201.

In some examples, the masking block 204 may be configured to apply one or more types of spatial masking to the multi-channel audio data 201 or to one or more sections of the audio features 203. According to some examples, the spatial masking may involve concealing, corrupting or eliminating at least a portion of spatial information of the multi-channel audio data 201 or the audio features 203. Some additional examples of spatial masking are described below with reference to FIG. 3.

The contextual encoder 206 may be, or may include, a neural network that is implemented by a portion of the control system 110, such as a transformer neural network or a reformer neural network. In this example, the contextual encoder 206 is configured to apply a contextual encoding process to masked audio feature data 205, to produce predicted spatial embeddings 207—which also may be referred to herein as "spatial representations" or "hidden spatial representations"—in a latent space. In some examples, the hidden representations block 208 (also referred to herein as spatial embeddings block 208) may process multiple instances of the predicted spatial embeddings 207 in order to generate a single predicted embedding 209. For example, in some implementations the contextual encoder 206 may be, or may include, a neural network. In some such implementations, different predicted spatial embeddings 207 may be output from different layers the neural network. The spatial embeddings block 208 may determine a single predicted embedding 209 from multiple predicted spatial embeddings 207, each of which is produced by a different layer. In some such examples, the spatial embeddings block 208 may apply a consolidation process, such as a pooling process, to multiple predicted spatial embeddings 207 to produce a single predicted embedding 209. In some examples, the spatial embeddings block 208 may produce a predicted embedding 209 that is a lower-dimension representation of multiple predicted spatial embeddings 207. According to some examples, the spatial embeddings block 208 may produce a single predicted embedding 209 according to one or more averaging processes. In some examples, the spatial embeddings block 208 may implement one or more attention-based averaging processes. In some such examples, the spatial embeddings block 208 may produce a single predicted embedding 209 according to at least one time-based averaging process, such as a process that operates on predicted spatial embeddings 207 that correspond to multiple frames of input data.

According to this example, the control system 110 is configured to obtain reference spatial embeddings 211 in the latent space. The reference spatial embeddings 211 may be obtained in various ways, depending on the particular implementation. Some examples are described below with reference to FIGS. 4 and 5.

In this example, the control system 110 is configured to apply a loss function and to determine a loss function gradient based, at least in part, on a variance between the predicted spatial embeddings 209 (in this example, the predicted spatial embedding 209 of FIG. 2, which is the current one output by the spatial embeddings block 208 that will be input to the loss function 210) and the reference spatial embeddings (in this example, the reference spatial embedding 211). In the example of FIG. 2, element 213 indicates the gradient of the loss function with respect to parameters of the contextual encoder 206. According to this example, the contextual encoder 206 is being trained according to a back propagation technique that involves working backwards from a loss with respect to the predicted spatial embeddings 209 and the reference spatial embedding 211, to determine the loss with respect to each of the trained parameters in the contextual encoder 206. This leads to the next step in a steepest descent algorithm, which may determine a more optimal set of parameters until convergence is reached. According to this example, optional element 212 indicates the gradient of the loss function with respect to parameters of the feature extractor 202, indicating that the feature extractor 202 may also be trained according to a back propagation technique.

According to some examples, the loss function may be the negative of a measure of similarity between the predicted spatial embedding 209 and the reference spatial embedding 211. The measure of similarity may, for example, be a measure of cosine similarity. In other examples, the loss function may be a mean square error loss function, a mean absolute error loss function, a Huber loss function, a log-cosh loss function, or another loss function. In some examples, the loss function 210 is only based on portions of the predicted embeddings corresponding to the masked region or regions of the masked audio feature data 205, such as the masked region 215 of the masked audio feature 214M, and the corresponding portions of the reference embeddings 211. According to this example, the control system 110 is configured to update the contextual encoding process according to the loss function gradient 213 until one or more convergence metrics are attained. In some examples, the control system 110 may be configured to determine that convergence has been attained when the contextual encoding process achieves a state in which the loss determined by the loss function settles to within an error range around a final value, or a state in which a difference between the predicted spatial embedding 209 and the reference spatial embedding 211 is no longer decreasing.

In this example, the elements of FIG. 2 include:

200: A SPRL (spatial representation learning) system;

201: The raw multi-channel input audio data;

202: An audio feature extraction block;

203: A stream of extracted audio features;

204: A masking block;

205: A stream of masked audio feature data;

206: A contextual encoder configured to predict the masked audio features;

207: The predicted spatial embeddings 207, which in this example are output predictions after passing the masked audio feature data through the contextual encoder 206;

208: The spatial embeddings block 208, which is configured to aggregate multiple predicted spatial embeddings 207 from the contextual encoder 206 to produce the predicted spatial embeddings 209;

209: The predicted spatial embeddings;

211: The reference spatial embeddings;

210: The loss function;

212: The gradient of the loss function with respect to the audio feature extraction parameters of the audio feature extraction block 202;

213: The gradient of the loss with respect to parameters of the contextual encoder 206;

214A: An extracted audio feature for a time frame;

214M: The masked counterpart of the extracted audio feature 214A; and

214P: the predicted embeddings for 214A output by the contextual encoder 206.

Figure 3:
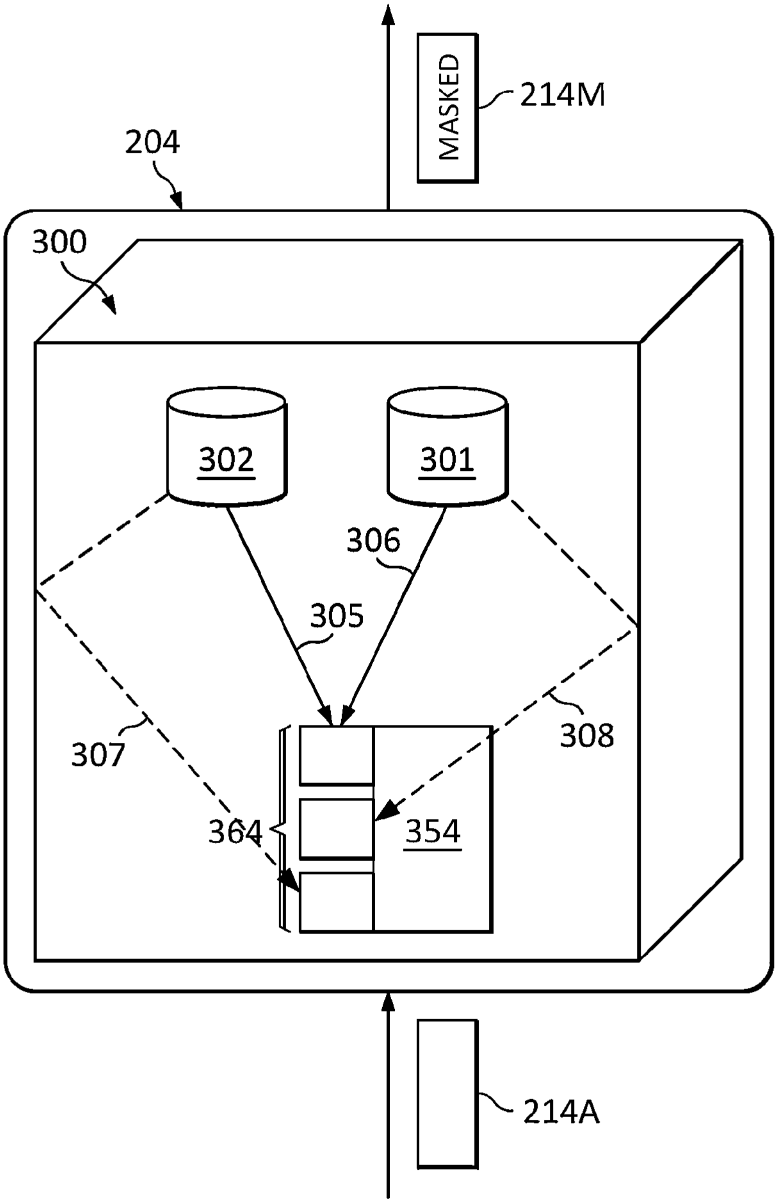
FIG. 3 shows a spatial masking process according to one example.

FIG. 3 shows a spatial masking process according to one example. As with other figures provided herein, the types, numbers and arrangements of elements shown in FIG. 3 are merely provided by way of example. Other implementations may include more, fewer and/or different types, numbers and arrangements of elements.

In this example, the masking block 204 is configured to implement a spatial masking process that involves adding, during a masking time interval, audio data corresponding to an artificial sound source in an artificial sound source acoustic zone. According to this example, the spatial masking process involves adding, during the masking time interval, audio data corresponding to an artificial sound source 302 that was not actually present when the multi-channel audio data corresponding to real sound source 301 was captured. In this example, the real sound source 301 is a speech source, such as a talking person, in the room 300 in which the multi-channel audio data were captured.

The masking time interval may vary according to the particular implementation. It can be beneficial to select one or more masking time interval corresponding to one or more types of interfering sounds that may, in practice, cause a target signal (such as audio data corresponding to a person's voice) to be masked. For example, one masking time interval may be selected to correspond with the time interval of an interfering speech utterance or an interfering sequence of dog barks, which may be 1, 2 or more seconds. Another masking time interval may be selected to correspond with the time interval of an interfering exclamation or an interfering dog bark, which may be less than one second in duration, such as half a second. Another masking time interval may be selected to correspond with the time interval of an interfering door slamming sound, which may correspond with the time interval of a few milliseconds.

According to this example, the elements of FIG. 3 are as follows:

214A: An extracted audio feature corresponding to the real sound source 310 during a time interval (for a time frame);

214M: A masked counterpart of the extracted audio feature 214A;

300: The room 300 in which the multi-channel audio data currently being processed was captured;

301: A real sound source within the room 300, which is a speech source in this example;

302: An artificial sound source 302, which also may be referred to as an interfering sound source, which was not actually present when the multi-channel audio data corresponding to the real sound source 301 was captured in the room 300;

354: An audio device that includes an array of microphones;

364: An array of microphones in or on audio device 354;

305: Direct sound from artificial sound source 302 that is captured by the array of microphones 364;

306: Direct sound from real sound source 301 captured by the array of microphones 364.

307: Sound reflections from the walls of the room 300 corresponding to artificial sound source 302;

308: Sound reflections from the walls of the room 300 corresponding to sounds from the real sound source 301.

The sound reflections 307 from the walls of the room 300 corresponding to artificial sound source 302 may be simulated in various ways, depending on the particular implementation. According to some examples, the sound reflections 307 may be simulated based on a library of recordings of sounds in actual rooms. In some examples, the sound reflections 307 may be simulated based on ray-traced acoustic models of a specified room. According to some examples, the sound reflections 307 may be simulated based on one or more parametric models of generic reverberations (for example, based on reverberation time, one or more absorption coefficients and an estimated room size. In some examples, the sound reflections 307 may be simulated based on a "shoebox" method, such as the method described in Steven M. Schimmel et al., "A Fast and Accurate "Shoebox" Room Acoustics Simulator," ICASSP-88, 1988 International Conference on May 2009, pages 241-244, which is hereby incorporated by reference.

In some examples, a spatial masking process may involve altering, during a masking time interval, an apparent acoustic zone of a sound source. In other words, the spatial masking may involve altering, during the masking time interval, a direction, area or zone from which sound corresponding to the sound source appears to come. In one such example, the spatial masking may involve altering, during the masking time interval, the area or zone from which sound corresponding to the real sound source 301 appears to come.

In some examples, the spatial masking process may involve temporarily switching audio channels. According to some such examples, the spatial masking process may involve presenting audio data from channel A as being audio data from channel B and presenting audio data from channel B as being audio data from channel A during a masking time interval.

According to some examples, the spatial masking process may involve reducing, during the masking time interval, a number of uncorrelated channels of the multi-channel audio data 201. Alternatively, or additionally, in some examples, the spatial masking process may involve increasing, during the masking time interval, a number of correlated channels of the multi-channel audio data 201. In some examples, the spatial masking process may involve combining, during the masking time interval, 2 or more audio signals corresponding to 2 or more independent sound sources in a single channel.

In some examples, the spatial masking process may involve altering, during the masking time interval, microphone signal covariance information of the multi-channel audio data 201. Some examples of microphone signal covariance information are described below.

Figure 4:
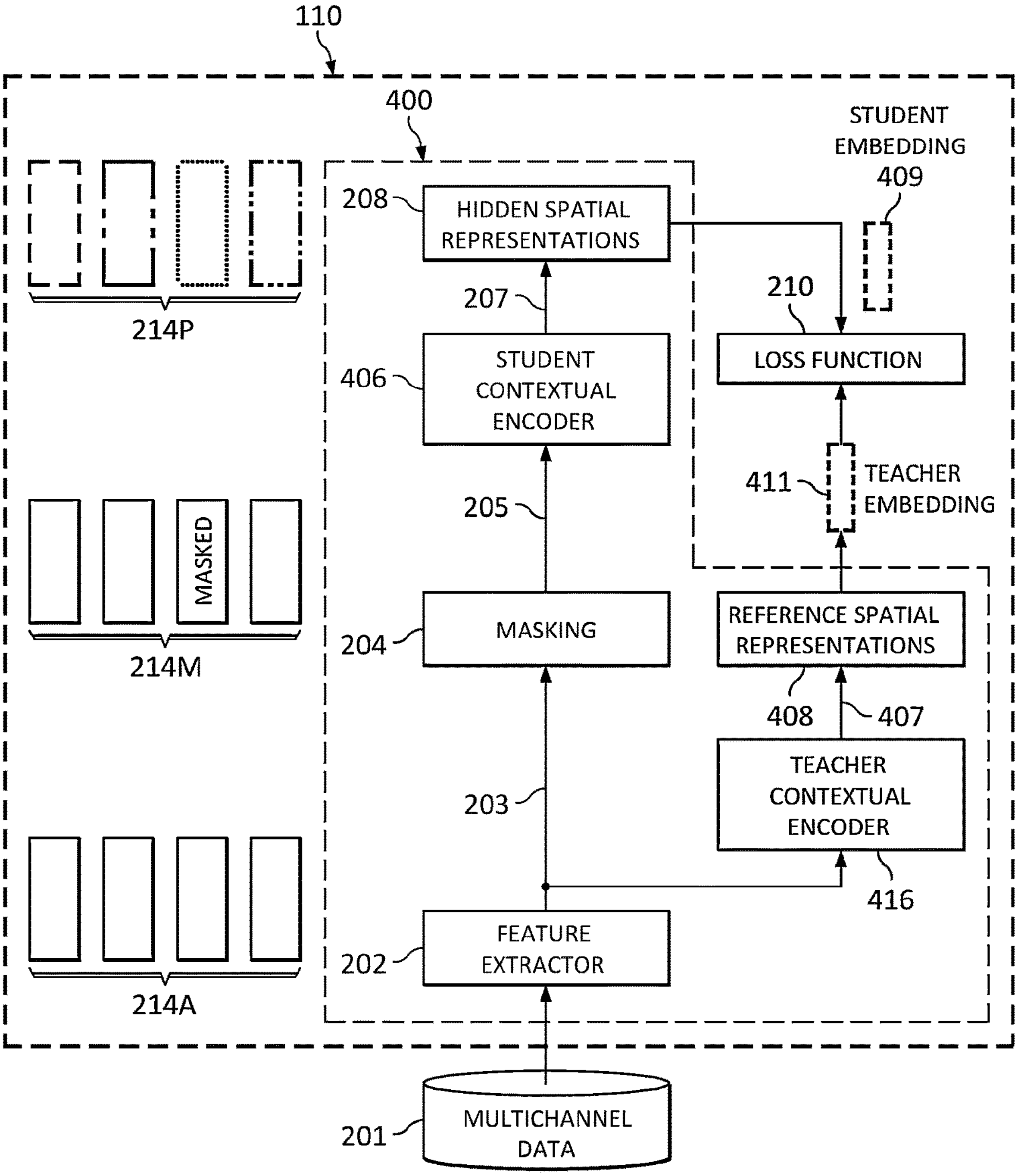
FIG. 4 shows blocks of an SPRL system according to another example.

FIG. 4 shows blocks of an SPRL system according to another example. FIG. 4 shows an example of an SPRL system 400 in which hidden spatial representations are learned using two contextual encoders, a student contextual encoder 406 and a teacher contextual encoder 416. In some examples, the hidden spatial representations may be learned according to a self-supervised training process. As with other figures provided herein, the types, numbers and arrangements of elements shown in FIG. 4 are merely provided by way of example. Other implementations may include more, fewer and/or different types, numbers and arrangements of elements. In this example, the blocks of the SPRL system 400 are implemented by an instance of the control system 110 of FIG. 1A. As noted elsewhere herein, the control system 110 may, in some implementations, reside in more than one device.

In this example, the multi-channel audio data 201, the audio feature extraction block 202, the audio features 203, the masking block 204, the masked audio feature data 205, the predicted spatial embeddings 207, the hidden representations block 208, the predicted spatial embeddings 209 and the loss function 210 may be as described above with reference to FIG. 2, so the foregoing descriptions will not be repeated here. According to this example, the student contextual encoder 406 is an instance of the contextual encoder 206 of FIG. 2 and the reference spatial representations block 408 is an instance of the hidden representations block 208 of FIG. 2.

The SPRL system 400 provides an example of how the reference spatial embeddings 211 of FIG. 2 may be obtained. In this example, the teacher embedding 411 shown in FIG. 4 is an instance of the reference embedding 211 shown in of FIG. 2. In this example, the teacher spatial embeddings 411 are based on unmasked audio features 203. According to this example, obtaining the teacher spatial embeddings 411 in the latent space involves applying, by the control system 110, a contextual encoding process to the unmasked audio features 203—in this example, by the teacher contextual encoder 416—to produce the teacher spatial embeddings 411. In some examples, the teacher contextual encoder 416 has the same configuration as the student contextual encoder 406. For example both the teacher contextual encoder 416 and the student contextual encoder 406 may include the same type(s) of neural network, the same number of layers, etc. In other examples, the teacher contextual encoder 416 may have a different configuration from that of the student contextual encoder 406. For example, the teacher contextual encoder 416 may have a simpler configuration—for example, fewer layers—than that of the student contextual encoder 406. A simpler configuration may be sufficient, because the tasks performed by the teacher contextual encoder 416 will generally be simpler than the tasks performed by the student contextual encoder 406.

According to this example, the teacher contextual encoder 416 is configured to apply a contextual encoding process to the unmasked audio features 203, to produce predicted spatial embeddings 407 in a latent space. In this example, the teacher contextual encoder 416 is configured to apply the same contextual encoding process as the student contextual encoder 406. Therefore, the predicted spatial embeddings 407 correspond to the predicted spatial embeddings 207 and the reference spatial representations block 408 corresponds to the hidden representations block 208, except that the predicted spatial embeddings 407 are based on the unmasked audio features 203 instead of the masked audio feature data 205. In this example, the student embedding 409 of FIG. 4 corresponds to the predicted spatial embedding 209 of FIG. 2.

Figure 5:
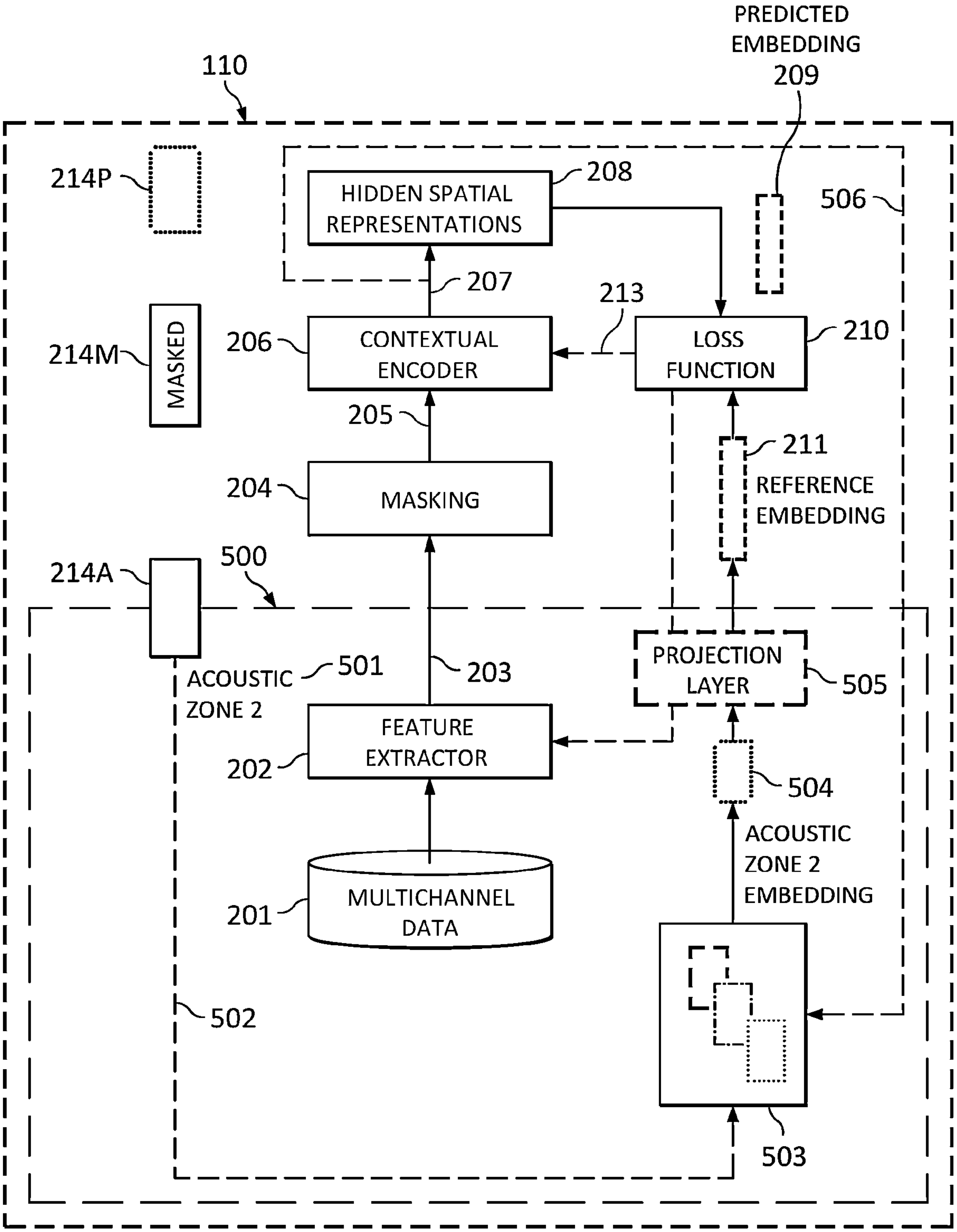
FIG. 5 shows blocks of an SPRL system according to yet another example.

FIG. 5 shows blocks of an SPRL system according to yet another example. As with other figures provided herein, the types, numbers and arrangements of elements shown in FIG. 5 are merely provided by way of example. Other implementations may include more, fewer and/or different types, numbers and arrangements of elements. In this example, the blocks of the SPRL system 500 are implemented by an instance of the control system 110 of FIG. 1A. As noted elsewhere herein, the control system 110 may, in some implementations, reside in more than one device.

FIG. 5 shows an example of an SPRL system 500 in which a clustering process is implemented for spatial unit discovery. In this example, the clustering process is used to produce the library of acoustic zone code words 503, which may also be referred to herein as a codebook of acoustic zone code words 503. According to some implementations, an initial codebook of code words, each code word of which corresponds to an acoustic zone, may be calculated prior to a training process, which may be a self-supervised training process. The initial codebook of acoustic zone code words 503 may, for example, be populated by determining an acoustic zone directionality matrix for each frame of a multichannel audio data training set. These acoustic zone directionality matrices may be clustered to produce C clusters. In some examples C may be 100. In alternative examples, C may be greater than 100 or less than 100. Each of the C clusters may be associated with a different acoustic zone. Accordingly, in some such examples, each code word in the codebook of acoustic zone code words 503 may correspond with only one of the C clusters and only one acoustic zone.

During a training process of the SPRL system 500, the codebook of acoustic zone code words 503 may be used to determine the reference embeddings 211. For example, the codebook of acoustic zone code words 503 may be used to determine the reference embeddings 211 by determining which cluster in the codebook of acoustic zone code words 503 is most similar to an extracted audio feature corresponding to each time frame. In the example shown in FIG. 5, the codebook of acoustic zone code words 503 determines that the extracted audio feature 214A is most similar to an embedding in the codebook of acoustic zone code words 503 that corresponds to acoustic zone 2. Therefore, the output 504 from the codebook of acoustic zone code words 503 is an embedding that corresponds to acoustic zone 2 in this particular instance.

If necessary, the optional projection layer 505 may be configured to project the output 504 to a different dimensional space, to ensure that the reference embedding 211 and the predicted embedding 209 are in the same dimensional space. For example, if the output 504 is a 768-dimensional value and the predicted embedding 209 is a 512-dimensional value, the optional projection layer 505 may be configured to project the output 504 from a 768-dimensional space into a 512-dimensional space.

In some implementations, the initial codebook of acoustic zone code words 503 may be updated during the training process according to the dynamic learning path 506. In the example shown in FIG. 5, the dynamic learning path 506 includes predicted spatial embeddings 207 that are used to update the codebook of acoustic zone code words 503. In some examples, the predicted spatial embeddings 207 may originate from one or more layers of the contextual encoder 206. In some alternative examples, the dynamic learning path 506 may include predicted embeddings 209.

The initial codebook of acoustic zone code words 503 may be calculated according to different methods, depending on the particular implementation. In some examples, each code word may correspond to a spatial position, area or zone of a sound source relative to microphones used to capture at least some of the multichannel audio data 201. According to some examples each code word may correspond to the covariance of signals corresponding to sound captured by each microphone of a plurality of microphones used to capture the multi-channel audio data. The covariance of signals corresponding to sound captured by each microphone of a microphone array can include information regarding the direction from which acoustic waves from a sound source arrive at those microphones.

In some such examples, the covariance of signals corresponding to sound captured by each microphone of a microphone array may be represented by a microphone covariance matrix. For example, if a microphone array includes 3 microphones, the covariance of those microphones may be determined by representing each sample of audio as a 1 by 3 column vector, each value of the column vector corresponding to one of the 3 microphones. If the column vector is multiplied by its own transpose—essentially multiplying every microphone sample by samples of the other microphones in the microphone array during the same time period—and the result is averaged over time, this produces a 3 by 3 microphone covariance matrix.

The covariance of signals corresponding to sound captured by each microphone of a microphone array may be frequency-dependent for a variety of reasons, including microphone spacing, the fact that the microphones involved are imperfect, the fact that sound from a sound source will be reflecting from walls differently at different frequencies, and the fact that the sound emitted by a sound source may have a different directionality at different frequencies. In order to capture a more complete representation of spatial features in the multichannel audio data 201, it is potentially advantageous to determine a microphone covariance matrix for multiple frequency bands.

Some such examples may involve transforming microphone covariance expressed in the time domain into microphone covariance in each of a plurality of frequency bins—for example via a fast Fourier transform—and summing the results according to a set of frequency banding rules. In one such example, a microphone covariance matrix may be determined for each of 40 frequency bands, such as Mel spaced or log spaced frequency bands. In other examples, a microphone covariance matrix may be determined for more or fewer frequency bands.

In the 40-band example, one would have 40 microphone covariance matrices, which describe a frequency-dependent microphone covariance in each of the 40 bands. In the above example, each microphone covariance matrix includes 9 complex numbers, each one of which has a real part and an imaginary part. More generally, a microphone covariance matrix may be expressed as an $N \times N$ complex matrix that is Hermitian, which means that the N diagonal elements of the matrix are real. It further means that $(N-1)*N/2$ complex values in the upper triangle of the matrix are complex conjugates of the lower triangle. Therefore, the matrix has N real numbers and $(N-1)*N/2$ complex numbers that represent all the degrees of freedom in the matrix. If one enumerates the real and imaginary parts, that gives a total of $N+(N-1)\times N=N+N\times N-N=N\times N$ real numbers that represent all the degrees of freedom. Therefore, in summary, a complex Hermitian N×N matrix can be summarized in N real numbers.

In the present example of 3 microphones, the 3×3 complex Hermitian covariance matrix in each band can be represented as 9 real numbers. These 40×9 real numbers are an example of spatial acoustic features 203.

Alternatively, or additionally, in some examples each microphone covariance matrix may be factor normalized as to signal level. According to some 3 by 3 microphone covariance matrix examples, one of the 9 matrix values may correspond with level, so normalization could reduce each matrix to a 40 by 8 matrix.

Accordingly, each frame of audio may be represented by a combination of, for example, 40 microphone covariance matrices that characterize spatial information corresponding to that frame of audio across each of 40 different frequency bands. The microphone covariance matrices may be combined into a single microphone covariance matrix, such as a single 40 by 9 matrix, a single 40 by 8 matrix, etc. According to some examples, the microphone covariance matrix for each sample of multichannel audio data in a training set—whatever the size of the microphone covariance matrix—may be clustered, for example according to a k-means clustering process, into C clusters. Each of the clusters may be associated with a distinct set of spatial properties. Each cluster may be assigned a number, for example from cluster zero to cluster 99, each of which is associated with a different acoustic zone. The resulting C clusters may be used as the initial codebook of acoustic zone code words 503.

In some examples, the spatial unit discovery process may involve clustering spatial features into a plurality of granularities. For example, the spatial unit discovery process may involve clustering spatial features using different numbers of audio frames. In some such examples, for each frame of audio, instead of having one number between zero and 99—or, more generally, between zero and (C-1)—one would have K numbers between zero and 99. One such clustering model may involve averaging over 10 audio frames in order to produce a microphone covariance matrix at one level of granularity, averaging over 100 audio frames (or a different number that is larger than 10) in order to produce a microphone covariance matrix at another level of granularity, averaging over 1000 audio frames (or a different number that is larger than the previous number) in order to produce a microphone covariance matrix at another level of granularity, etc. In some such examples, for each frame of audio, 3 cluster numbers may be generated, each one associated with one of the three levels of clustering.

The initial codebook of acoustic zone code words 503 includes embeddings associated with acoustic zones, which were created from "unlabeled" multi-channel audio data 201 as this term is used herein, according to a self-supervised process. "Labeled" multi-channel audio data could, for example, include human-labeled multi-channel audio data or multi-channel audio data with associated direction-of-arrival (DOA) metadata, etc. According to this example, the multi-channel audio data 201 used to construct the initial codebook of acoustic zone code words 503 did not include any such labels.

Figure 6:
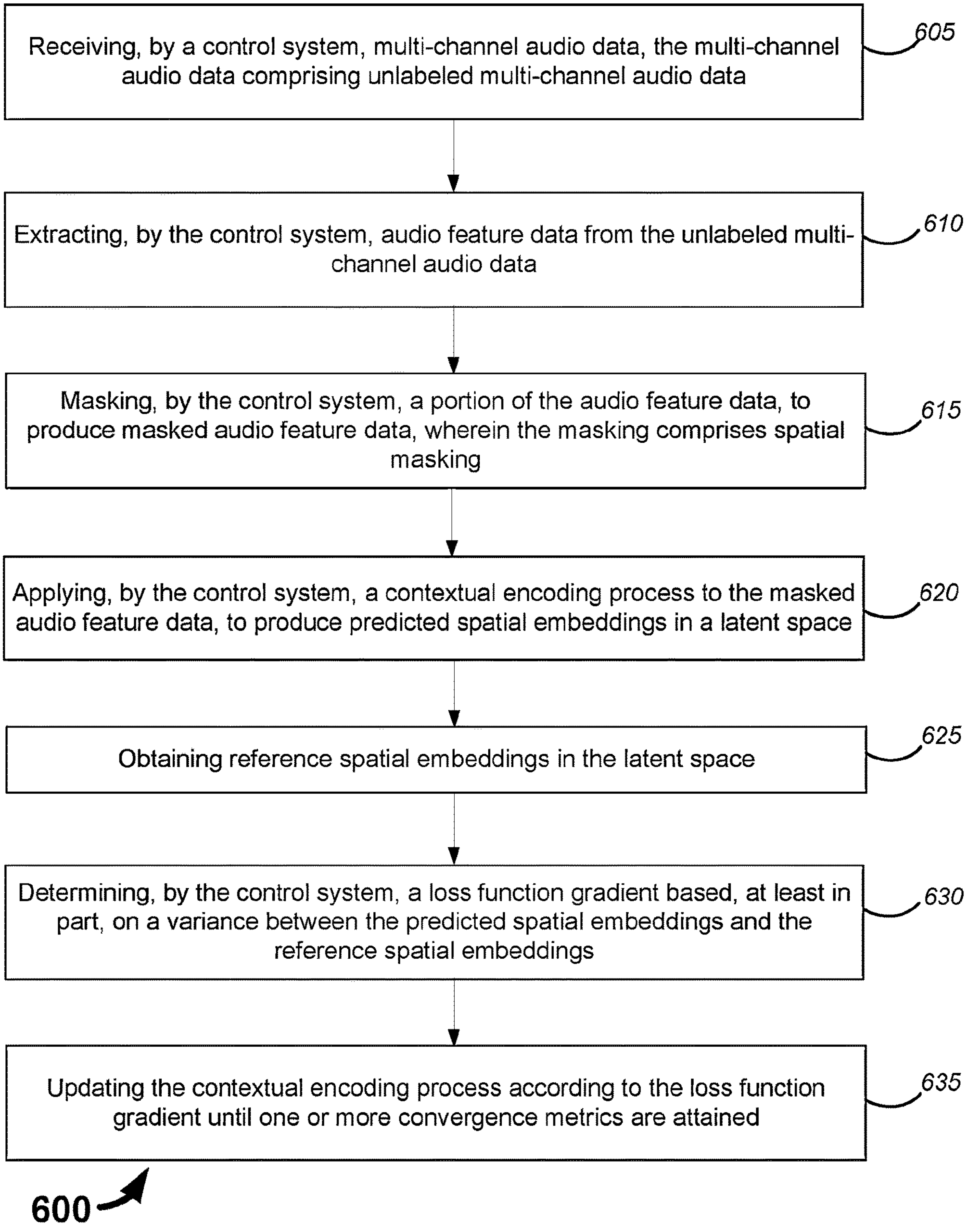
FIG. 6 is a flow diagram that outlines one example of a disclosed method.

FIG. 6 is a flow diagram that outlines one example of a disclosed method. The blocks of method 600, like other methods described herein, are not necessarily performed in the order indicated. According to some examples, one or more blocks may be performed in parallel. Moreover, some similar methods may include more or fewer blocks than shown and/or described. In this example, method 600 involves training an SPRL system.

The method 600 may be performed by an apparatus or system, such as the apparatus 100 that is shown in FIG. 1A and described above. In some examples, the apparatus 100 includes at least the control system 110 shown in FIGS. 1A and 2 and described above. In some examples, at least some aspects of method 600 may be performed by one or more devices within an audio environment, e.g., by an audio system controller (such as what may be referred to herein as a smart home hub) or by another component of an audio system, such as a television, a television control module, a laptop computer, a mobile device (such as a cellular telephone), etc. However, in some implementations at least some blocks of the method 600 may be performed by one or more devices that are configured to implement a cloud-based service, such as one or more servers.

In this example, block 605 involves receiving, by a control system, multi-channel audio data. In this example, the multi-channel audio data includes unlabeled multi-channel audio data. In some examples, the multi-channel audio data may include only unlabeled multi-channel audio data. Block 605 may, for example, obtaining a frame of audio data from a memory device that is storing the multi-channel audio data 201 that is shown in FIG. 2, 4 or 5.

According to this example, block 610 involves extracting, by the control system, audio feature data from the unlabeled multi-channel audio data. According to some examples, audio features 203 may be extracted by the audio feature extraction block 202 in block 610.

In this example, block 615 involves masking, by the control system, a portion of the audio feature data, to produce masked audio feature data. According to this example, block 615 involves one or more types of spatial masking. In some examples, block 615 may involve the masking block 204 masking one or more sections of the audio features 203, to produce the masked audio feature data 205.

According to this example, block 620 involves applying, by the control system, a contextual encoding process to the masked audio feature data, to produce predicted spatial embeddings in a latent space. In some examples, block 620 may involve the contextual encoder 206 applying a contextual encoding process to the masked audio feature data 205, to produce predicted spatial embeddings 207 in a latent space.

In this example, block 625 involves obtaining, by the control system, reference spatial embeddings in the latent space. The reference spatial embeddings 211 may be obtained in various ways, depending on the particular implementation. In some examples, the reference spatial embeddings 211 may be obtained as described herein with reference to FIG. 4 or as described herein with reference to FIG. 5.

According to this example, block 630 involves determining, by the control system, a loss function gradient based, at least in part, on a variance between the predicted spatial embeddings and the reference spatial embeddings. In some examples, the loss function gradient based may be based on the loss function 210 disclosed herein, on based on a similar loss function. According to some examples, the loss function may be the negative of a measure of similarity between the predicted spatial embedding 209 and the reference spatial embedding 211. In some examples, the loss function may be applied only to portions of the predicted embeddings corresponding to the masked region or regions of the masked audio feature data 205, such as the masked region 215 of the masked audio feature 214M, and the corresponding portions of the reference embeddings 211.

In this example, block 635 involves updating, by the control system, the contextual encoding process according to the loss function gradient until one or more convergence metrics are attained. In some examples, the contextual encoding process implemented by the contextual encoder 206 may be updated in block 635.

Method 600 may involve implementing various types of spatial masking, depending on the particular implementation. In some examples, the spatial masking may involve concealing, corrupting or eliminating at least a portion of spatial information of the multi-channel audio data. According to some examples, the spatial masking may involve swapping channels during a masking time interval. The spatial masking may, for example, involve presenting audio data from channel A as being audio data from channel B and presenting audio data from channel B as being audio data from channel A during a masking time interval. In some examples, the spatial masking may involve altering, during the masking time interval, an apparent acoustic zone of a sound source. According to some examples, the spatial masking may involve adding, during the masking time interval, audio data corresponding to an artificial sound source in an artificial sound source acoustic zone. In some examples, the spatial masking may involve reducing, during the masking time interval, a number of uncorrelated channels of the multi-channel audio data. Alternatively, or additionally, the spatial masking may involve increasing, during the masking time interval, a number of correlated channels of the multi-channel audio data. In some examples, the spatial masking may involve combining, during the masking time interval, 2 or more audio signals corresponding to 2 or more independent sound sources in a single channel. According to some examples, the spatial masking may involve altering, during the masking time interval, microphone signal covariance information of the multi-channel audio data.

In some examples, obtaining reference spatial embeddings in the latent space may involve applying, by the control system, a contextual encoding process to unmasked audio feature data corresponding to the masked audio feature data, to produce the reference spatial embeddings. The description of FIG. 4 provides some relevant examples.

According to some examples, obtaining reference spatial embeddings in the latent space may involve a spatial unit discovery process. The description of FIG. 5 provides some relevant examples. In some such examples, the spatial unit discovery process may involve a clustering process. According to some such examples, spatial features may be clustered according to a plurality of granularities. In some examples, the clustering may involve applying an ensemble of k-means models with different codebook sizes.

In some examples, the spatial unit discovery process may involve generating a library of code words. According to some such examples, each code word may correspond to an acoustic zone of an audio environment. In some examples, each code word may correspond to a spatial position of a sound source relative to microphones used to capture at least some of the multi-channel audio data. According to some examples, each code word may correspond to covariance of signals corresponding to sound captured by each microphone of a plurality of microphones used to capture the multi-channel audio data. In some examples, the covariance of signals is represented by a microphone covariance matrix.

According to some examples, method 600 may involve updating the library of code words according to output of the contextual encoding process.

According to some examples, the predicted spatial embeddings may correspond to estimated cluster centroids in the latent space. In some examples, the predicted spatial embeddings may correspond to representations of acoustic zones in the latent space.

In some examples, the multi-channel audio data may include audio data captured by different types of microphone arrays, for example two or more different types of microphone arrays. According to some examples, the multi-channel audio data may include various numbers of channels. For example, the multi-channel audio data may include 2-channel audio data, 3-channel audio data, 5-channel audio data, 6-channel audio data, 7-channel audio data, or various combinations thereof. More generally, one could say that in some examples the multi-channel audio data may include at least N-channel audio data and M-channel audio data, wherein N and M are greater than or equal to 2 and represent integers of different values.

According to some examples, method 600 may involve a self-supervised learning process. In some such examples, method 600 may involve training a neural network according to a self-supervised learning process. In some examples, method 600 may involve training a neural network implemented by the control system, after the control system has been trained according to at least blocks 605 through 635 of FIG. 6, to implement one or more types of "downstream" audio processing functionality. The downstream audio processing functionality may include noise suppression functionality, speech recognition functionality, talker identification functionality, or combinations thereof. In some examples, method 600 may involve implementing the downstream audio processing functionality by the control system. For example, method 600 may involve implementing the noise suppression functionality, the speech recognition functionality, the talker identification functionality, or combinations thereof.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

What is claimed is:

1. A method, comprising:

masking, by a control system, a portion of audio feature data of unlabeled multi-channel audio data, to produce masked audio feature data, wherein the masking comprises spatial masking;

applying, by the control system, a contextual encoding process to the masked audio feature data, to produce predicted spatial embeddings in a latent space;

obtaining, by the control system, reference spatial embeddings in the latent space;

determining, by the control system, a loss function gradient based, at least in part, on a variance between the predicted spatial embeddings and the reference spatial embeddings; and updating, by the control system, the contextual encoding process according to the loss function gradient until one or more convergence metrics are attained.

2. The method of claim 1, wherein obtaining reference spatial embeddings in the latent space involves applying, by the control system, a contextual encoding process to unmasked audio feature data corresponding to the masked audio feature data, to produce the reference spatial embeddings.

3. The method of claim 1, wherein obtaining reference spatial embeddings in the latent space involves a spatial unit discovery process.

4. The method of claim 3, wherein the spatial unit discovery process involves clustering spatial features into a plurality of granularities.

5. The method of claim 4, wherein the clustering involves applying an ensemble of k-means models with different codebook sizes.

6. The method of claim 3, wherein the spatial unit discovery process involves generating a library of code words, each code word corresponding to an acoustic zone of an audio environment.

7. The method of claim 6, wherein each code word corresponds to a spatial position of a sound source relative to microphones used to capture at least some of the multi-channel audio data.

8. The method of claim 6, wherein each code word corresponds to covariance of signals corresponding to sound captured by each microphone of a plurality of microphones used to capture the multi-channel audio data.

9. The method of claim 8, wherein the covariance of signals is represented by a microphone covariance matrix.

10. The method of claim 6, further comprising updating the library of code words according to output of the contextual encoding process.

11. The method of claim 4, wherein the predicted spatial embeddings correspond to estimated cluster centroids in the latent space.

12. The method of claim 1, wherein the predicted spatial embeddings correspond to representations of acoustic zones in the latent space.

13. The method of claim 1, wherein the multi-channel audio data includes at least N-channel audio data and M-channel audio data, wherein N and M are greater than or equal to 2 and represent integers of different values.

14. The method of claim 1, wherein the multi-channel audio data includes audio data captured by two or more different types of microphone arrays.

15. The method of claim 1, further comprising training a neural network implemented by the control system, after the control system has been trained, to implement noise suppression functionality, speech recognition functionality, talker identification functionality, source separation functionality, voice activity detection functionality, audio scene classification functionality, source localization functionality, noise source recognition functionality or combinations thereof.

16. The method of claim 15, further comprising implementing, by the control system, the noise suppression functionality, the speech recognition functionality or the talker identification functionality.

17. The method of claim 1, wherein the spatial masking involves concealing, corrupting or eliminating at least a portion of spatial information of the multi-channel audio data.

18. The method of claim 1, wherein the spatial masking involves presenting audio data from channel A as being audio data from channel B and presenting audio data from channel B as being audio data from channel A during a masking time interval.

19. The method of claim 1, wherein the spatial masking involves altering, during the masking time interval, an apparent acoustic zone of a sound source.

20. The method of claim 1, wherein the spatial masking involves adding, during the masking time interval, audio data corresponding to an artificial sound source in an artificial sound source acoustic zone.

21. The method of claim 1, wherein the spatial masking involves reducing, during the masking time interval, a number of uncorrelated channels of the multi-channel audio data.

22. The method of claim 1, wherein the spatial masking involves increasing, during the masking time interval, a number of correlated channels of the multi-channel audio data.

23. The method of claim 1, the spatial masking involves combining, during the masking time interval, 2 or more audio signals corresponding to 2 or more independent sound sources in a single channel.

24. The method of claim 1, wherein the spatial masking involves altering, during the masking time interval, microphone signal covariance information of the multi-channel audio data.

25. The method of claim 1, wherein the control system is configured to implement a neural network.

26. The method of claim 1, wherein operations (a) through (g) involve a self-supervised learning process.

27. An apparatus comprising:

a control system configured to:

mask a portion of audio feature data of unlabeled multi-channel audio data, to produce masked audio feature data, wherein the masking comprises spatial masking;

apply a contextual encoding process to the masked audio feature data, to produce predicted spatial embeddings in a latent space;

obtain reference spatial embeddings in the latent space;

determine a loss function gradient based, at least in part, on a variance between the predicted spatial embeddings and the reference spatial embeddings; and update the contextual encoding process according to the loss function gradient until one or more convergence metrics are attained.

28. The method of claim 1 comprising receiving, by a control system, multi-channel audio data, the multi-channel audio data comprising unlabeled multi-channel audio data; and extracting, by the control system, audio feature data from the unlabeled multi-channel audio data.

29. A non-transitory computer program product comprising instructions which, when being executed by a computer, cause the computer to carry out the method according of claim 1.

* * * * *